Patented Apr. 11, 1933 1,903,656

UNITED STATES PATENT OFFICE

FLOYD M. REECE, OF SOUTH BEND, INDIANA, ASSIGNOR TO O'BRIEN VARNISH COMPANY, OF SOUTH BEND, INDIANA, A CORPORATION OF INDIANA

NONDRYING OIL AND PRODUCT THEREOF

No Drawing. Application filed November 26, 1930. Serial No. 498,509.

The present invention relates to non-drying or substantially non-drying oils derived by heat treatment of China-wood or tung oil and to products containing the same, more particularly liquid coating compositions of the latter type.

In my prior application Serial No. 486,865, filed October 6, 1930, I have disclosed a process for the heat treatment of China-wood oil wherein the oil is rapidly heated, preferably while in continuous flow in a restricted stream through a heating zone and is caused to pass through the temperature range in which China-wood oil normally tends to polymerize or thicken and form a gel without permitting such thickening or gel formation. By carrying such heat treatment to temperatures above 650° F. and preferably to temperatures of at least 675 to 700° F. for a sufficient period of time and rapidly cooling the product, I secure an oil product which is non-drying or substantially non-drying. This liquid, non-drying thermolyzed China-wood oil product I have found to be of great value as an ingredient of cellulose ester lacquers, acting both as a plasticizer and softening agent. It is likewise of great value in lacquer compositions having other bases, for example, synthetic resins such as soluble phenol-methylene condensation products, glycerine-phthalic acid resins and the like, as a softening agent for the resulting film and in promoting adherence to metal surfaces.

In preparing the non-drying, thermolyzed China-wood oil product of the present invention, as disclosed in my prior application above referred to, I prefer to pass the oil continuously through a heated coil in which it is rapidly raised through the normal thickening or polymerizing temperature range for China-wood oil (say from 450 to 550° F.) with sufficient rapidity to prevent polymerization or thickening of the oil, and in its continuous flow is further heated to a temperature above 650° F. and preferably to 675° F. or higher, the oil being maintained at such high temperature for a sufficient period to substantially reduce or eliminate the drying properties of the product. I prefer to carry the temperature of the oil in such operation from 700 to 750° F. and preferably about 700° F. in securing the non-drying product, since such a product is secured at such temperatures with substantially no further continued holding of the high temperature of the oil. The oil is immediately cooled to halt thermolytic action.

As set forth in my co-pending application Ser. No. 486,865, the following is a specific example of such process. Untreated China-wood oil was passed, under a pressure of 25 pounds, through a coil formed of 60 feet of one-half inch inside diameter copper tubing. The coil was of spiral or helical form and was mounted in a gas fired furnace. The oil was charged into the coil at a temperature of 75° F. and at a rate of 45 gallons per hour. The oil was discharged from the coil at a temperature of 700–725° F. and was immediately passed into a coil, immersed in a cooling fluid, wherein it was cooled to a temperature of 200° F. The cooled oil was thereupon passed to a receiving drum wherein any gases separate from the oil.

The resulting oil product is substantially non-drying in its properties and, with respect to the original China-wood oil from which it is produced, has a lower specific gravity, lower saponification and iodine numbers, and a higher acid number. Its index of refraction is markedly below that normal for China-wood oil. The specific gravity is in general below 0.920 and the iodine number below 100, as compared with the range of 150 to 165 normal for China-wood oil. The index of refraction is in general below 1.500 at 19° C. Thus a typical product in accordance with the present invention is non-drying, and has an iodine number of 93.5 and an index of refraction at 19° C. of 1.4998.

When used in the preparation of cellulose ester compositions, and particularly with lacquers, the non-drying thermolyzed China-wood oil product is valuable both as a plasticizer and softening agent, increasing the strength and flexibility of the film. It may likewise be incorporated in lacquers or similar compositions having as their bases the synthetic resins such as the soluble phenol-methylene condensation resins, furfural resins, glycerine-phthalic acid resins resulting from the condensation of glycerine with phthalic acid alone or also with monobasic aliphatic acids such as "glyptal", or other soluble synthetic resins, being wholly compatible with both the natural and synthetic soluble resins as well as the soluble cellulose esters. With all such resin base compositions, the non-drying thermolyzed China-wood oil has a softening action upon the film and is particularly effective in increasing the adherence of the film to the base to which it is applied, and particularly to metallic surfaces. In general, in such cellulose ester and resin lacquers, enamels and the like, the non-drying thermolyzed China-wood oil of the present invention may be employed in the same proportions in which plasticizers and/or castor oil are employed, say from 1 to 50% of the lacquer bases, being fully compatible with the normal resin and solvent constituents thereof. It may likewise be incorporated in similar proportion in molding compositions containing such cellulose esters and resins, to soften and prevent brittleness of articles formed therefrom, improve adherence to metal inserts, and the like.

The following formulas are typical of compositions embodying the non-drying thermolyzed China-wood oil:

1.

| | Per cent |
|---|---|
| Nitrocellulose | 5 |
| Alcohol | 20 |
| Benzol | 20 |
| Butyl acetate | 40 |
| Butyl alcohol | 10 |
| Ethyl acetate | 4 |
| Non-drying thermolyzed China-wood oil | 1 |

2.

| | |
|---|---|
| Cellulose acetate | 75 lbs. |
| Acetone | 60 gallons |
| Methyl-ethyl-ketone | 10 gallons |
| Alcohol | 14 gallons |
| Benzol | 14 gallons |
| Benzyl alcohol | 2 gallons |
| Non-drying thermolyzed China-wood oil | 1 gallon |

3.

| | Per cent |
|---|---|
| Amyl acetate | 35–45 |
| Amyl alcohol | 20–30 |
| Methanol | 15–25 |
| Petroleum naphtha | 30–45 |
| Non-drying thermolyzed China-wood oil | 4–6 |
| Copal resin | 3 |
| Nitrocellulose | 3 |

4.

| | Per cent |
|---|---|
| Glycerine-phthalic acid resin, such as "Glyptol" | 5 to 10 |
| Acetone | 10 to 15 |
| Amyl acetate | 25 to 40 |
| Non-drying thermolyzed China-wood oil | 1 to 3 |
| Alcohol | 10 to 20 |
| Benzol | 10 to 20 |

In any of the above formulas any desired portion of pigment may be employed. Other plasticizers may be used in conjunction with the non-drying thermolyzed China-wood oil, such as triphenyl phosphate, and any of the usual solvents either of the high-boiling, low-boiling, or mixed solvent type may be used as is customary in the production of such varnishes or lacquers.

I claim:

1. A coating composition comprising a soluble lacquer base and a non-drying liquid oil product having the characteristics of China-wood oil which has been heated as high as 625° F. in the absence of gelatinization inhibiting substances in so short a time as to avoid gelatinization while reducing the index of refraction to a point below 1.499.

2. A coating composition as set forth in claim 1, in which the lacquer base is a cellulose ester.

3. A coating composition as set forth in claim 1, in which the soluble lacquer base is a soluble synthetic resin.

4. A coating composition comprising a soluble lacquer base and a non-drying liquid oil product having the characteristics of China-wood oil which has been heated to 700–725° F. while passing through a heated tube one-half inch in inside diameter and approximately 60 ft. long at a rate in the order of 45 gallons per hour.

5. The method of softening a soluble lacquer base which comprises incorporating therewith a non-drying liquid oil having the characteristics of China-wood oil which has been heated as high as 625° F. in the absence of gelatinization inhibiting substances in so short a time as to avoid gelatinization while reducing the index of refraction to a point below 1.499.

FLOYD M. REECE.